May 3, 1960   J. V. CRAWFORD ET AL   2,935,084
AIR PRESSURE REGULATOR
Filed May 2, 1955

JAMES V. CRAWFORD,
RICHARD A. FISCHER,
DAN B. LE MAY,
    INVENTORS.

BY John H. Wallace

United States Patent Office 2,935,084
Patented May 3, 1960

2,935,084
AIR PRESSURE REGULATOR

James V. Crawford and Richard A. Fischer, Los Angeles, and Dan B. Le May, Palos Verdes Estates, Calif., assignors to The Garrett Corporation, Los Angeles, Calif., a corporation of California Application May 2, 1955, Serial No. 507,356

(Filed under Rule 47(a) and 35 U.S.C. 116)

2 Claims. (Cl. 137—505.38)

This invention relates generally to air or gas pressure systems and is particularly directed to air pressure systems employed in inflating collapsible containers, for example, lifesaving devices, such as life rafts or escape slides, such systems utilizing bottles of compressed air or other suitable gas, as a source of power and means for reducing the pressure of air or gas flowing from such source to a safe, usable value. Still more particularly, the invention relates to an improvement in gas or air pressure regulators for controlling fluid flow from a bottle of compressed fluid to a point of use.

Prior regulators, provided for use with bottle type sources of compressed fluid and aspirators, have been objectionable because the tendency of the regulated pressure to decline or "droop" as the source pressure diminishes caused considerable inefficiency in container filling operations. An object of this invention, therefore, is to provide a pressure regulating mechanism which will avoid the above objection by causing the regulated pressure to increase gradually as the source pressure diminishes until a predetermined minimum source pressure is reached, at which time the regulator will interrupt the main flow from the source. This type of operation, when the regulator is used in conjunction with an aspirator, increases the efficiency and expedites the container filling operation.

An object of this invention is to provide a pressure regulator which is particularly adaptable for use in a system for inflating a collapsible bag, such system having a bottle containing air at high pressure and a jet pump or aspirator to which the air is supplied at a reduced but superatmospheric pressure to induce a flow of atmospheric air into the bag.

A further object of the invention is to provide a pressure regulator for use with a source of compressed air of fixed or predetermined amount, the regulator being so constructed that its output to the regulated pressure passage or outlet will be increased as the pressure in the bottle or other source is decreased due to the reduction in amount.

Another object of the invention is to provide a pressure regulating device for use with a source of compressed air or other gas of fixed or predetermined amount, the regulator being so constructed that when the supply becomes so depleted that the pressure thereof will not allow the regulated pressure to be maintained at the required level, the main flow from the source will be cut off.

A further object of the invention is to provide a pressure regulating device of the type set forth in the preceding paragraph, with a restricted by-pass to permit the compressed gas or air remaining at the source to be bled to the regulated pressure outlet over a prolonged period of time after the main flow has been cut off, so that fluid loss from the device equipped with the system, either through gaseous contraction or escape, will be replaced.

A still further object of the invention is to provide a gas or air pressure regulator for controlling the flow of fluid from a source to a point of use, the regulator having a valve element responsive in part to the difference between a combination of the pressures of the source and the regulated pressure and atmospheric pressure, to meter the flow from the source, the volume metered increasing as the supply pressure decreases until the supply pressure reaches a predetermined minimum, at which time the valve will close to interrupt the main flow from the supply.

Another object of the invention is to provide a gas pressure regulator having a body formed for communication with a bottle of compressed air and a regulated pressure utilizing device, the body having valve means for metering the flow of air from the bottle to the regulated pressure outlet, and actuating means connected with the valve to effect regulating movement thereof in response to variations in the regulated pressure and/or the supply pressure and the ambient air pressure, the actuating means being biased toward a position to prevent gas flow, the surface areas of the actuating means exposed to gas pressure and the biasing force being carefully calculated to secure the desired action of the regulator.

Another object of the invention is to provide a fluid pressure system having a regulator for reducing the pressure of fluid flowing from a source of high pressure to a part of the system receiving fluid at a regulated lower pressure, the regulator having a combination valve and actuator assembly arranged to cooperate with one of a pair of valve seats to meter fluid flow from the source to the region of regulated pressure and to cooperate with the other valve seat to discontinue flow from the source when the pressure therein declines to a value which might be so low as to interfere with the proper or efficient use of the system.

Other objects and advantages will be apparent from the following description and the accompaning drawing in which one form of the invention has been illustrated in detail.

In the drawing:

Figue 1 is a diagrammatic view of a system for inflating a container with air under pressure, the system having a regulator formed in accordance with the present invention incorporated therein.

Figure 1:
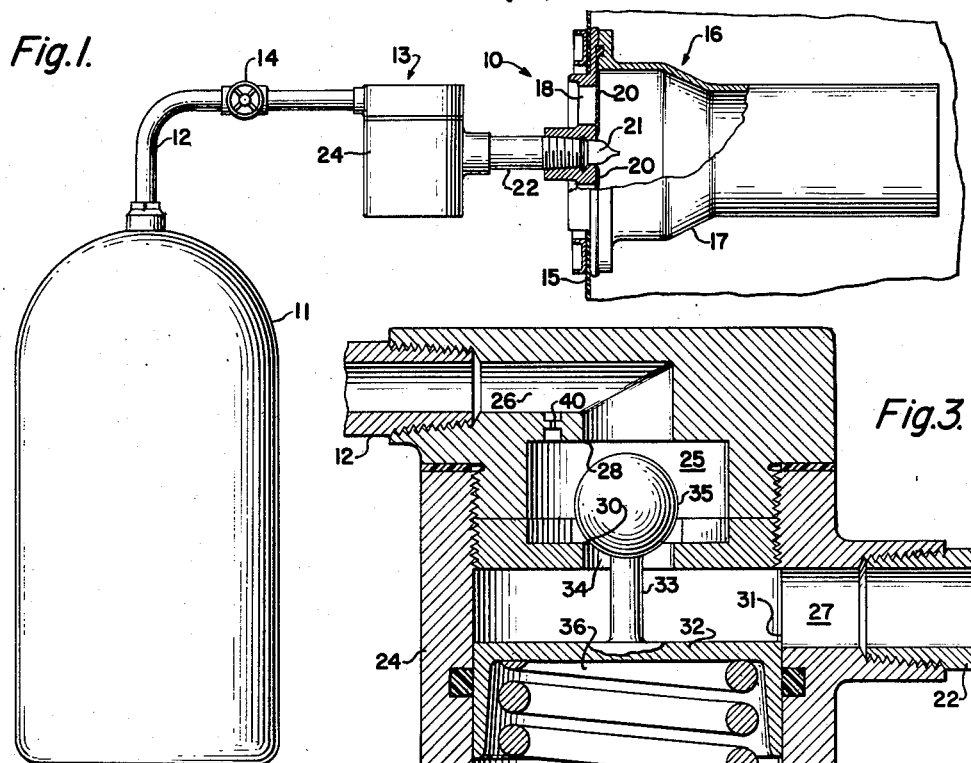

Referring more particularly to the drawing, the numeral 10 designates the container filling system in its entirety. The system selected for illustration utilizes a bottle of compressed air or other suitable gas, the bottle being designated by the numeral 11. A conduit 12 leads from this bottle to the inlet of the regulator 13, the conduit 12 having a suitable on-and-off valve 14 for starting and stopping the operation of the system. The system 10 is used in the present illustration for inflating a collapsible container 15, such as a life raft, escape slide or similar device adapted for low pressure inflation use, generally having a fabric bag into which air or other gas is introduced. By way of illustration, the system is provided with a jet pump or aspirator, designated generally by the numeral 16, that shown being similar to the aspirator forming the subject matter of our co-pending application, Serial No. 507,355, filed of even date herewith, which has matured into Patent Number 2,772,829. As described in the co-pending application, the aspirator includes a tubular body 17 mounted in a wall of the bag 15, the tube having an inlet end 18 provided with check valves 20 and a jet nozzle 21, the nozzle being so formed and disposed in the body 17 that fluid under pressure supplied thereto will flow from an orifice at high velocity to induce a flow of atmospheric air past the valves 20 into the bag to effect its inflation. The regulator 13 has been provided to reduce highly compressed air to a pressure suitable for use by the aspirator 16. A tube 22 leads from the outlet of the regulator 13 to the nozzle 21.

Figure 3:
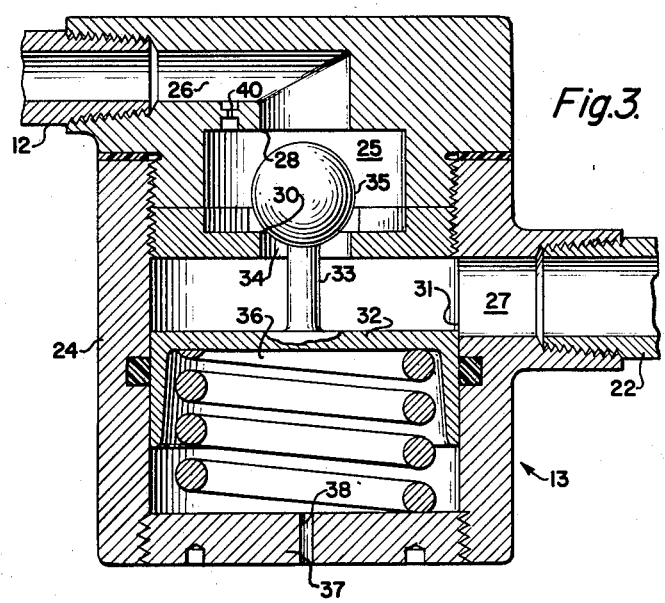
Figure 3 is a similar view showing the parts of the regulator in the positions occupied during use.
Figure 2:
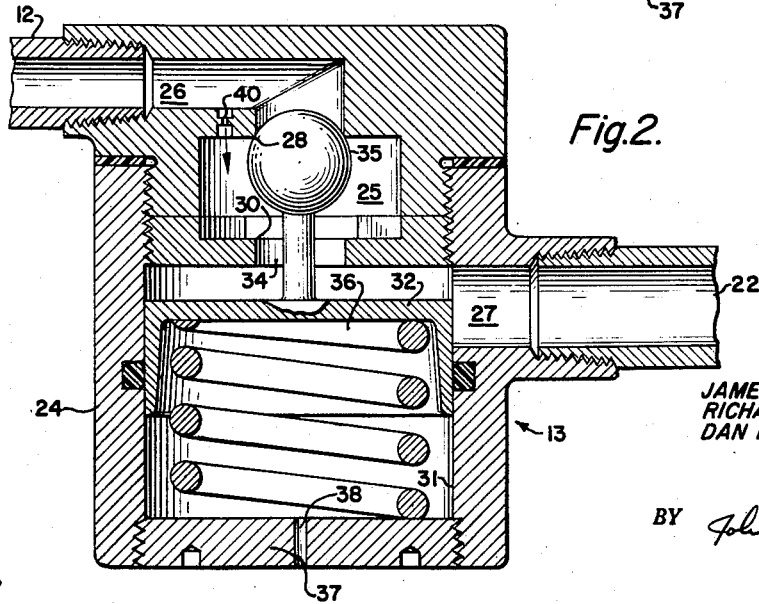
Figure 2 is a vertical sectional view showing somewhat diagrammatically the internal mechanism of the regulator provided in the system shown in Figure 1, the parts of the regulator occupying inactive positions.

As illustrated in Figures 2 and 3, the regulator comprises a body 24 formed of suitable material and having a valve chamber 25 with an inlet passage 26 communicates at one side and a regulated pressure passage 27 communicates at the opposite side. The inlet passage 26 receives air or other fluid from the bottle 11 through the conduit 12. At the point of communication of the passage 26 with the valve chamber 25, the body 24 is formed with a valve seat 28; a second seat 30 is formed at the point of communication of the chamber 25 and the passage 27. Passage 27 includes a guide chamber 31 in which a piston type valve actuator 32 is disposed for longitudinal movement. This actuator has a stem 33 projecting therefrom through a port 34, the latter constituting a continuation of the chamber 31 and a part of the regulated pressure passage 27, the seat 30 being formed at the point where the port 34 enters the chamber 25. In the chamber 25, a ball-shaped valve element 35 is disposed for movement between seats 28 and 30, the ball being carried by the stem 33 and suitably secured thereto; the ball 35, stem 33 and piston 32 move as an integral unit when the ball travels from one seat to the other. Normally, when the system 10 is inoperative, the ball valve element 35 will be retained in engagement with the seat 28 by a coil spring 36 disposed between the piston 32 and a wall 37 forming an end of the guide chamber 31.

Conduit 22 is connected with the body 24 and establishes communication between the regulated pressure passage 27 and the jet nozzle 21. Piston 32 is exposed at one side to the pressure obtaining in passage 27, the opposite side of this piston being exposed to atmospheric pressure introduced into the guide chamber through a port 38. When the system is idle, the valve 14 will be closed and piston 32 will be exposed on both sides to atmospheric pressure. Spring 36 will then be holding ball valve 35 in engagement with seat 28. When valve 14 is moved to an open position, fluid under pressure will flow from the container 11 through the conduit 12 and inlet passage 26 into engagement with the portion of the valve 35 exposed to passage 26. The force of this fluid under pressure will move ball valve and piston 32 downwardly in opposition to the force of the spring 36 causing ball valve 35 to move away from seat 28; fluid under pressure will then flow into the valve chamber 25, past seat 30 and through the port 34 to the regulated pressure chamber 27. This fluid will then flow through conduit 22 to nozzle 21. Since this nozzle is provided with a restricted orifice, the flow of fluid from the nozzle will be resisted and pressure will build up in the nozzle 21, conduit 22 and passage 27, the same pressure existing in port 34 and chamber 31 above piston 32. As this pressure increases, the combined force of the fluid under pressure from the source or container 11 applied to the valve 35 and the force of the pressure in passage 27 will be applied to piston 32 and will move the piston and ball valve downwardly until the latter approaches seat 30; fluid flow past seat 30 and through port 34 will be metered. The pressure in regulated pressure passage 27 will then be maintained substantially at a predetermined value, this value being that at which maximum efficiency will be secured from the aspirator 16.

As the pressure at the source 11 decreases, due to the depletion of the supply, the valve 35 will be moved away from seat 30 to permit sufficient fluid to flow from the source to the regulated pressure passage to maintain this regulated pressure or effect its gradual increase in a manner determined by the force of the spring 36 and the relative areas of the piston 32 and valve 35. As the supply pressure continues to decrease, the ball valve 35 will approach seat 28 and tend to then reduce the volume of fluid flowing from the passage 26 into the valve passage. This tendency to reduce the volume of fluid flowing from the source permits a slight decrease in pressure in the regulated pressure passage and spring 36 will then move the ball valve into engagement with the seat 28 to prevent further flow of fluid from the source past seat 28 to the regulated pressure passage. When the valve closes in this manner, the source will still contain some fluid under pressure. To utilize this remaining fluid to maintain the regulated pressure, the body 24 is formed with a restricted orifice 40 which forms a passage for by-passing the valve seat 28. Thus, fluid may bleed from the source past the closed valve 35 into the valve chamber 25 and regulated pressure passage 27 to maintain such regulated pressure. This restricted flow of fluid will compensate for leakage or contraction of air in the collapsible container 15 and the period of useful life thereof will be prolonged.

It will be apparent from the foregoing that a regulator has been provided which will serve to meter the flow of fluid from a source of predetermined amount to the portion of a system designed to receive fluid at regulated pressure and, when the source approaches depletion, will thus reduce the flow therefrom to maintain a reduced flow to replace loss or other decay of the regulated pressure.

While the invention has been illustrated in but a single form, it is obvious that many minor changes in the construction and relation of parts may be made without departing from the spirit and scope of the invention, as set forth in the following claims:

We claim:

1. A pressure regulator comprising a body providing a valve chamber, an inlet passage for gas under pressure, an outlet for regulated gas pressure and a valve actuator chamber communicating with the regulated gas pressure outlet passage and the atmosphere; a first valve seat in said body between said gas inlet passage and said valve chamber; a second valve seat in said body between said valve chamber and said regulated gas pressure outlet; a valve element disposed in said valve chamber for movement between said seats; valve actuator means disposed in said valve actuator chamber for reciprocation, said valve element being movable with said valve actuator means; resilient means in said body, said resilient means tending to retain said valve element in engagement with said first seat, said valve element being adapted to be unseated from the first valve seat by the force of gas pressure in the inlet passage applied to the valve element and, when said valve element is unseated from said first valve seat, to be urged toward said second seat in response to the gas pressures in said valve chamber and said regulated gas outlet, said gas pressure being applied to said valve element and valve actuator means in opposition to the force of said resilient means; and means forming a passage establishing restricted communication between said inlet passage and said regulated gas pressure outlet through said valve chamber and said second valve seat.

2. A pressure regulator for controlling the flow of a compressed fluid, comprising: a body having a piston chamber and a valve chamber aligned with the piston chamber, said body forming an inlet leading to one end of the valve chamber, a passageway establishing communication between the opposite end of said valve chamber and said piston chamber, and an outlet leading from said piston chamber; a first valve seat in said body at the point of communication of said inlet and said valve chamber; a second valve seat at the point of communication of said valve chamber and said passageway; a valve element normally retained in engagement with said first valve seat and disposed in said valve chamber for movement relative to said first and second valve seats, the valve element being adapted to be unseated from the first valve seat by the force of fluid pressure in the inlet passage applied to the valve element; a piston disposed in said piston chamber for movement toward and away from said valve chamber, said valve element being connected for movement with said piston so that when said valve element is unseated from said first valve seat the combination of the force of the fluid from the inlet passage applied to the valve element and the force of the fluid from the passageway applied to the piston tends to move the valve element toward the second valve seat; resilient means in said piston chamber opposing said forces acting on said piston and valve element and tending to move the valve element toward the first valve seat; and means forming a by-pass extending around said first valve seat and establishing restricted communication between the inlet and the valve chamber.

References Cited in the file of this patent

UNITED STATES PATENTS

| | | |
|---|---|---|
| 162,948 | Pounds | May 4, 1875 |
| 392,539 | Christian | Nov. 6, 1888 |
| 424,199 | Haskell | Mar. 25, 1890 |
| 1,349,443 | Stokes et al. | Aug. 10, 1920 |
| 1,540,439 | Thrall | June 2, 1925 |
| 2,016,234 | Hughes | Oct. 1, 1935 |
| 2,061,022 | Huff | Nov. 17, 1936 |
| 2,183,569 | Hughes | Dec. 19, 1939 |
| 2,403,436 | Heigis | July 9, 1946 |
| 2,405,010 | Bucknam | July 30, 1946 |
| 2,509,597 | Hamilton | May 30, 1950 |
| 2,526,972 | Ray | Oct. 24, 1950 |

FOREIGN PATENTS

| | | |
|---|---|---|
| 478,156 | Great Britain | Jan. 13, 1938 |